3,769,283
N-ACYL SYDNONIMINE DERIVATIVES
Katsutada Masuda, Ashiya, and Yoshio Imashiro, Suita, Japan, assignors to Takeda Chemical Industries, Ltd., Osaka, Japan
No Drawing. Continuation-in-part of abandoned application Ser. No. 651,137, July 5, 1967. This application Sept. 14, 1970, Ser. No. 72,211
Claims priority, application Japan, July 4, 1966, 41/43,499
Int. Cl. C07d 87/42, 87/46
U.S. Cl. 260—247.2 A
5 Claims

ABSTRACT OF THE DISCLOSURE

Derivatives of the sydnonimines according to U.S. Pat. No. 3,312,690, wherein the imino group is replaced by N-formyl, N-acetyl, N-propionyl, N-monochloro acetyl, N-dichloro acetyl, N-trichloro acetyl, N-trifluoro acetyl, N-phenoxy acetyl, N-phenoxy propionyl, N-phenyl acetyl, N-phenyl propionyl, N-cinnamoyl, N-benzoyl, N-ethoxy carbonyl, N-benzyloxy carbonyl, N-methyl carbamoyl, N-ethyl carbamoyl, N-phenyl carbamoyl, N-nicotinoyl, N-isonicotinoyl, N - (N' - carbobenzyloxy alanyl), N-methyl sulfonyl, N-phenyl sulfonyl, N-p-chlorophenyl sulfonyl, N-nitroso, etc., and pharmaceutically acceptable salts thereof have superior utility as hypotensive drugs, coronary and peripheral vessel dilators or muscle relaxants. The 3-positioned

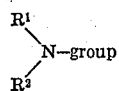

may also be an

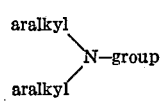

each aralkyl having 7 to 9 carbon atoms.

---

This application is a continuation-in-part of application Ser. No. 651,137, filed July 5, 1967, and now abandoned.

This invention relates to novel medicinally useful sydnonimines of the type of the sydnonimines of U.S. Pat. No. 3,312,690:

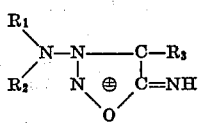

(the variables being as defined in the patent), wherein the hydrogen atom of the =NH group of the latter is replaced by a nitroso group or by an acyl group, and wherein $R_1$ and $R_2$ may also be aralkyl, as hereinafter defined. The invention also encompasses the pharmaceutically acceptable acid addition salts of the new compounds. The said new compounds correspond to the formula

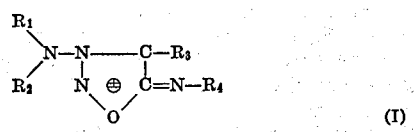

(I)

wherein $R_3$ is hydrogen or alkyl having 1 to 5 carbon atoms, each of $R_1$ and $R_2$ is alkyl having 1 to 5 carbon atoms or phenyl alkyl having 7 to 9 carbon atoms, or $R_1$ and $R_2$ taken together with the adjacent N-atom represent morpholino, pipecolino,

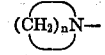

wherein $n$ is 4, 5 or 6,

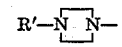

wherein $R'$ is alkyl having 1 to 5 carbon atoms or

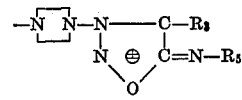

wherein $R_3$ is as precedingly defined, $R_4$ in each case represents —NO, $R_5CO$— wherein $R_5$ is alkyl, halo alkyl, phenoxyalkyl, phenyl alkyl, phenyl alkenyl, alkanoylalkyl, alkoxy or phenyl alkoxy, said groups having up to nine carbon atoms respectively, or hydrogen, phenyl, phenyl amino, pyridyl or 1-(carbobenzyloxy amino) ethyl, or $R_6SO_2$— wherein $R_6$ is halo phenyl or acetylaminophenyl.

Compounds I and their pharmaceutically acceptable acid addition salts have characteristic effects as hypotensive drugs, coronary and peripheral vessel dilators or muscle relaxants. The new compounds and their salts of this invention are also characterized by the rapidity with which, after administration, they manifest their blood-pressure lowering effect, and also by the extended time of persistence of such effect; moreover, the said new compounds and their salts show a relatively low acute toxicity. In addition, the said compounds I and their salts are effective in relaxing muscles and relaxing coronary vessels. Thus, they are useful as medicines for the therapy of hypertension, Raynaud's disease, etc.

In Formula I, $R_3$ stands for H or alkyl having one to five carbon atoms such as methyl, ethyl, propyl, n-butyl, isobutyl, amyl, $R_4$ stands for (1) the ON-group, or (2) an $R_5CO$— wherein $R_5$ is alkyl having up to nine carbon atoms such as methyl, ethyl, propyl, n-butyl, tert-butyl and amyl, halo alkyl having up to nine carbon atoms such as monochloromethyl, dichloromethyl, trichloromethyl, monofluoromethyl, difluoro methyl, trifluoromethyl, monochloroethyl, dichloroethyl and trifluoroethyl, phenoxyalkyl having up to nine carbon atoms such as phenoxymethyl and phenoxyethyl, phenyl alkyl having up to nine carbon atoms such as benzyl and phenylethyl, phenyl alkenyl having up to nine carbon atoms such as styryl, alkanoyl alkyl having up to nine carbon atoms such as acetyl methyl and propionyl ethyl, alkoxy having up to nine carbon atoms such as methoxy, ethoxy, propoxy, n-butoxy, tert-butoxy and t-amyloxy, phenyl alkoxy having up to nine carbon atoms such as benzyloxy, hydrogen, phenyl, phenylamino, 1-(carbobenzyloxyamino) ethyl, pyridyl group such as 2-pyridyl, 3-pyridyl and 4-pyridyl, or (3) $R_6SO_2$— wherein $R_6$ is halo phenyl such as o-chlorophenyl, m-chlorophenyl, p-chlorophenyl, or p-acetyl aminophenyl, and $R_1$ and $R_2$ each stands for alkyl having one to five carbon atoms, such as methyl, ethyl, propyl, isopropyl, n-butyl, tert-butyl, amyl, or phenyl alkyl having seven to nine carbon atoms, such as benzyl, phenyl ethyl, phenyl propyl, and $R_1$ and $R_2$ may form together with the adjacent nitrogen atom a ring such as morpholino, pipecolino,

wherein $n$ is 4, 5 or 6, which is examplified by piperidino, pyrrolidino, or hexahydroazepinyl,

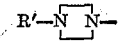

wherein R' is alkyl having one to five carbon atoms such as methyl, ethyl, propyl, isopropyl, n-butyl, tert-butyl or amyl, or

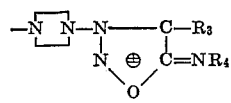

radical wherein $R_3$ and $R_4$ have respectively the same meanings as above.

The compounds of Formula I, which form pharmaceutically acceptable salts with various acids, are exemplified as follows:

3-morpholino-N-formyl sydnonimine;
3-morpholino-N-acetyl sydnonimine;
3-morpholino-N-propionyl sydnonimine;
3-morpholino-N-monochloro acetyl sydnonimine;
3-morpholino-N-dichloro acetyl sydnonimine;
3-morpholino-N-trichloro acetyl sydnonimine;
3-morpholino-N-trifluoro acetyl sydnonimine;
3-morpholino-N-phenoxy acetyl sydnonimine;
3-morpholino-N-phenoxy propionyl sydnonimine;
3-morpholino-N-phenyl acetyl sydnonimine;
3-morpholino-N-phenyl propionyl sydnonimine;
3-morpholino-N-cinnamoyl sydnonimine;
3-morpholino-N-benzoyl sydnonimine;
3-morpholino-N-methoxy carbonyl sydnonimine;
3-morpholino-N-ethoxy carbonyl sydnonimine;
3-morpholino-N-propoxy carbonyl sydnonimine;
3-morpholino-N-benzyloxy carbonyl sydnonimine;
3-morpholino-N-methyl carbamoyl sydnonimine;
3-morpholino-N-ethyl carbamoyl sydnonimine;
3-morpholino-N-phenyl carbamoyl sydnonimine;
3-morpholino-N-nicotinoyl sydnonimine;
3-morpholino-N-isonicotinoyl sydnonimine;
3-morpholino-4-methyl-N-benzoyl sydnonimine;
3-morpholino-4-ethyl-N-benzoyl sydnonimine;
3-dimethylamino-N-benzoyl sydnonimine;
3-dimethylamino-4-methyl-N-benzoyl sydnonimine;
3-morpholino-N-(N'-carbobenzyloxy alanyl) sydnonimine;
3-morpholino-N-methyl sulfonyl sydnonimine;
3-morpholino-N-phenyl sulfonyl sydnonimine;
3-morpholino-N-n-chlorophenyl sulfonyl sydnonimine;
3-morpholino-N-nitroso sydnonimine;
3-diethylamino-N-benzoyl sydnonimine;
3-di-n-butyl amino-N-nitroso sydnonimine;
3-di-n-butylamino-N-benzoyl sydnonimine;
3-dibenzyl amino-4-methyl-N-nitroso sydnonimine;
3-piperidino-N-benzoyl sydnonimine;
3-piperidino-N-nitroso sydnonimine;
3-hexahydroazepinyl-N-nitroso sydnonimine;
3-α-pipecolino-N-benzoyl sydnonimine;
3-pyrrolidino-N-nitroso sydnonimine;
3-(N-methyl piperazino)-N-nitroso sydnonimine;
3,3'-(1,4-piperazino-diyl)-N,N'-dinitroso bis sydnonimine;
3-α-pipecolino-N-nitroso sydnonimine, etc.

Compounds I of the present invention are produced by acylating a corresponding compound of the Formula II

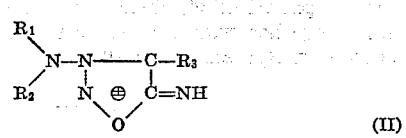

wherein $R_1$, $R_2$ and $R_3$ have respectively the same meanings as above set forth.

The starting material of the Formula II of the present invention is produced by a method described in the afore-said Pat. No. 3,312,690, the method being shown by the following equation:

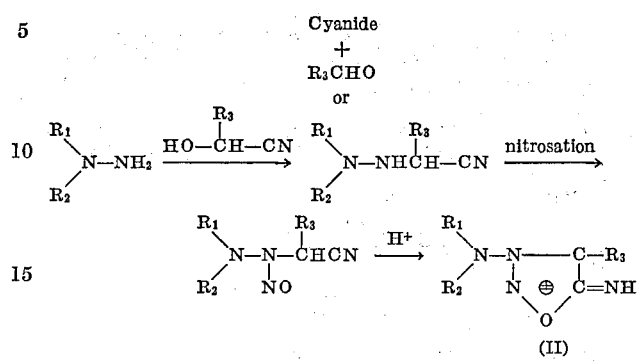

wherein $R_1$, $R_2$ and $R_3$ have respectively the same meanings as above. The reaction of the present invention is carried out by reacting a starting material of the above Formula II with an acylating agent for introducing the desired group (ON—, $R_5$CO—, or $R_6SO_2$—) onto the nitrogen atom bound to the 5-positioned carbon atom of the starting materials.

The introduction of the —NO group is effected in conventional manner per se known, for example, by reacting a starting material of the Formula II with a nitroso compound, such as alkali metal nitrite (e.g., sodium nitrite, potassium nitrite) or ammonium nitrite in an aqueous medium preferably under cooling, or by passing nitrous acid fumes into a solution or suspension of the starting material preferably under cooling, in an organic solvent such as pyridine or an inorganic solvent such as water or a mixture thereof.

The introduction of an $R_5$CO— or $R_6SO_2$— group is effected in per se known manner, for example, by reacting the starting material of Formula II with a reactive derivative of the corresponding acid $R_5$COOH or $R_6SO_3H$, such as an acid halide (e.g., acid chloride, acid bromide, acid iodide, acid fluoride), an acid anhydride, acid ester, ketene or isocyanate, preferably under cooling, in water or an organic solvent such as alcohol, pyridine, acetonitrile, ether, with the use of an acid eliminating agent such as an alkaline substance (e.g., sodium hydroxide, sodium bicarbonate, sodium carbonate) or an amine compound (e.g., triethyl amine, pyridine).

Thus, the desired N-acyl sydnonimine derivatives I are produced as free base or acid salts. When the objective compounds are obtained as free base, these compounds may be converted into their pharmaceutically acceptable salts of a mineral acid (e.g., hydrochloric, nitric, sulfuric, phosphoric acid, etc.), or of an organic acid (e.g., formic, acetic, butyric, citric, ascorbic, salicylic, p-aminosalicylic acid, etc.).

The present N-acyl sydnonimine derivatives (I) or their salts are advantageously administered in the form of an aqueous solution containing about 1 milligram of N-acyl sydnonimine per milliliter of water and are generally administered per os but injection can also be applied, the dose for an adult being within the range from about 5 to about 100 milligrams per day.

For the purpose of giving those skilled in the art a better understanding of the invention, the following illustrative tests and examples are given.

TEST FOR DEPRESSOR RESPONSE

The compounds of the present invention were respectively administered to a stomach or a duodenum of an anestehtiated cat with pyloricligated stomach through a tube previously put into the stomach or the duodenum. At various intervals after the administration, the systolic and diastolic blood pressure of the cat was measured with a haemodynamometer to determine the percent change of dropped pressure. The results of the tests are as follows:

TABLE I

| Compound | Route of administration | Dose mg./kg. | Percent change of dropped pressure, syst./diast. | | | | |
|---|---|---|---|---|---|---|---|
| | | | 15 min. | 30 min. | 60 min. | 120 min. | 240 min. |
| 3-morpholino-N-ethoxy carbonyl sydnonimine | G | 2 | −8/−5 | −7/−6 | −12/−7 | −16/−11 | −16/−11 |
| | D | 1 | −33/−24 | −35/−27 | −30/−19 | −19/−12 | −7/−5 |
| 3-morpholino-N-benzoyl sydnonimine hydrochloride | G | 1 | −11/−10 | −12/−11 | −13/−14 | −17/−13 | −15/−9 |
| | D | 1 | −10/0 | −11/0 | −12/0 | −12/0 | −10/0 |
| Control (3-morpholino-sydnonimine) hydrochloride | G | 1 | 0/0 | 0/0 | 0/0 | 0/0 | 0/0 |
| | D | 1 | −31/−30 | −34/−35 | −30/−39 | −15/−12 | −10/−9 |

N.B.; G=Intra-gastric administration: D=Intra-duodenum administration.

From the results of the test, it can be seen that the hitherto-known sydnonimine test compound is absorbed only from the duodenum and is scarcely absorbed from the stomach. In sharp contrast, the test compounds (I) of this invention are absorbed not only from the duodenum but also from the stomach in large amount. This demonstrates that the compounds (I) of this invention show their activities more rapidly than the control compound.

TEST FOR HYPOTENSIVE EFFECT

The compounds of the present invention were severally administered orally to Nembutal-anesthetized dogs (5 kg.) and the blood pressure of the respective test dog was continuously measured by a haemodynamometer and the distinctions of the blood pressure before the administration and at various intervals after the administration were determined, the distinctions being indicated as "dropped blood pressure" in Table II:

TABLE II

| Compound | Dropped blood pressure mm./Hg | | | | | |
|---|---|---|---|---|---|---|
| | 10 min. | 20 min. | 30 min. | 60 min. | 120 min. | 180 min. |
| 1 | −13 | −18 | −25 | −40 | −40 | −31 |
| 2 | −11 | −22 | −23 | −30 | −30 | −22 |
| Control 3 | −10 | −14 | −18 | −14 | −12 | −11 |

NOTE.—Compound (1): 3-morpholino-N-ethoxycarbonyl sydnonimine; Compound (2): 3-morpholino-N-benzoyl sydnonimine hydrochloride; Control compound (3): 3-morpholino sydnonimine hydrochloride.

The compounds (12 and (2) of the present invention are more effective, and have a longer effective duration than the control compound (3) in lowering blood-pressure.

TEST FOR ACUTE TOXICITY

The compounds of this invention were administered intraperitioneally to groups, each consisting of four mice (male, 4 weeks old, ICR-JCL strain).

Thus-administered mice were observed for 30 days to count the number of mice killed within the period and to measure the time of decease of the last-killed mouse within the said period. The results are as follows:

TABLE 3

| | Number of killed mouse or mice | | | |
|---|---|---|---|---|
| Dose, mg./kg.[1] | 1,000 | 500 | 250 | 125 |
| Compound: | | | | |
| 3-morpholino-N-benzoyl sydnonimine hydrochloride | 4, 60 minutes | 0 | 0 | 0 |
| 3-morpholino-N-ethoxy carbonyl sydnonimine | 0 | 0 | 0 | 0 |
| 3-morpholino-N-p-chlorobenzenesulfonyl sydnonimine | 0 | 0 | 0 | 0 |
| 3-morpholino-N-nitroso sydnonimine | 1, 12 hours | 0 | 0 | 0 |
| 3-morpholino-N-acetyl sydnonimine hydrochloride | 4, 15 minutes | 0 | 0 | 0 |
| Control 3-morpholino sydnonmine/hydrochloride | 4, 10 minutes | 4, 15 minutes | 1, 40 minutes | 0 |

[1] Milligrams per kilograms.

The compounds (I) of this invntion are thus shown to have remarkably less toxicity in comparison with the control compound.

The following examples are illustrative of presently preferred exemplary embodiments of this invention. In these examples, parts by weight bear the same relationship to parts by volume as do grams to milliliters.

EXAMPLE 1

Twenty parts by weight of 3-morpholinosydnonimine hydrochloride suspended in a mixture of 200 parts by volume of acetic anhydride and 40 parts by volume of pyridine are agitated for 48 hours at room temperature (about 15° to about 30° C.), whereby precipitates are formed. The precipitates are collected by filtration and are recrystallized from about 700 parts by volume of ethanol to give 20.3 parts by weight (84%) of 3-morpholino-N-acetyl sydnonimine hydrochloride having a melting point of 175° C. (with decomposition).

Analysis.—Calculated for $C_9H_{15}N_4O_3Cl$ (percent): C, 38.64; H, 5.27; N, 22.53. Found (percent): C, 38.77; H, 5.26; N, 22.23.

EXAMPLE 2

To 5.0 parts by weight of 3-morpholinosydnonimine hydrochloride suspended in 25 parts by weight of pyridine, there are added dropwise under ice-cooling and with stirring, 5.0 parts by weight of benzoyl chloride, and then the mixture is agitated for 4 hours, crude crystals being formed. The crude crystals thus obtained are collected by filtration, washed with 75 parts by volume of water, and recrystallized from 500 parts by volume of absolute methanol to yield 5.5 parts by weight of 3-morpholino-N-benzoylsydnonimine having a melting point of 186 to 188° C.

5.5 parts by weight of thus-obtained 3-morpholino-N-benzoyl sydnonimine is dissolved in methanolic hydrochloric acid, and the solvent is evaporated off under reduced pressure, crude crystals being formed. Recrystallization of the crude crystals from methanol gives 6.0 parts by weight of 3-morpholino-N-benzoyl syndonimine hydrochloride having a melting point of 159 to 160° (with decomposition).

Analysis.—Calculated for $C_{13}H_{15}N_4O_3Cl$ (percent): C, 50.25; H, 4.87; N, 18.03. Found (percent): C, 50.35; H, 4.78; N, 17.99.

In a manner similar to the above, the following compounds are obtained:

3 - diethylamino - N - benzoyl sydnonimine, M.P. 143–145° C.
3-piperidino-N-benzoyl sydnonimine, M.P. 175° C.
3-α-pipecolino-N-benzoyl sydnonimine, M.P. 116–118° C.
3-di-n-butylamino-N-benzoyl sydnonimine (colorless oily substance) I.R. absorption cm.$^{-1}$, 1610, 1580, 1550.

EXAMPLE 3

To 1.0 part by weight of 3-morpholinosydnonimine hydrochloride suspended in 5 parts by volume of pyridine, there are added dropwise, under ice-cooling and with stirring, 1.2 parts by weight of p-chlorophenyl sulfonyl chloride, and the mixture is agitated overnight at room temperature, whereby crystals are formed, followed by addition of 30 parts by volume of water. The mixture is subjected to filtration to obtain 1.5 parts by weight of crude crystals which are recrystallized from about 200 parts by volume of ethanol to give 1.3 parts by weight (78%) of 3-morpholino-N-p-chlorophenyl sulfonyl sydnonimine melting at 178 to 179° C. (with decomposition).

*Analysis.*—Calculated for $C_{12}H_{13}N_4O_4SCl$ (percent): C, 41.80; H, 3.80; N, 16.25. Found (percent): C, 41.50; H, 3.72; N, 16.13.

EXAMPLE 4

1.6 parts by volume of ethyl chloroformate is stirred dropwise into a suspension of 1.0 part by weight of 3-morpholinosydnonimine hydrochloride in 5 parts by volume of pyridine, and the mixture is agitated for a while to allow reaction to take place. Pyridine is removed from the reaction mixture by evaporation, and the residue is dissolved in a small amount of water and extracted with chloroform several times. The extractant is dehydrated by adding anhydrous magnesium sulfate and subjected to filtration. Chloroform is removed from the filtrate by distillation, crude crystals being obtained. Recrystallization of the crude crystals from toluene gives 0.6 part by weight of 3-morpholino-N-carboethoxysydnonimine having a melting point of 140 to 141° C. Yield 51%.

*Analysis.*—Calculated for $C_9H_{14}N_4O_4$ (percent): C, 44.62; H, 5.83; N, 23.13. Found (percent): C, 44.57; H, 5.85; N, 23.19.

EXAMPLE 5

To 2.0 parts by weight of 3-morpholinosydnonimine hydrochloride dissolved in 20 parts by volume of water, there are added, under ice-cooling and with stirring, 0.9 part by weight of sodium bicarbonate and, after 5 minutes, there is further added 1.2 parts by weight of phenyl isocyanate. The mixture is then agitated for 6 hours and kept standing overnight, the resultant precipitates being separated from the reaction mixture by filtration. Thus-recovered precipitates are subjected to column chromatography to remove contaminant diphenylurea. Recrystallization of thus-treated crude crystals from methanol gives 0.8 part by weight of 3-morpholino-N-phenyl carbamoyl syndnonimine having a melting point of 162° C. (with decomposition).

*Analysis.*—Calculated for $C_{13}H_{15}N_5O_3$ (percent): C, 53.97; H, 5.23; N, 24.21. Found (percent): C, 54.04; H, 5.53; N, 24.29.

By the same procedure as above, the precipitates are separated from the reaction mixture by filtration, and are then dissolved in methanolic hydrochloric acid, after which the methanol is distilled off from the solution. The residue is washed with acetone to remove diphenylurea, crude 3-morpholino-N-phenyl carbamoyl syndnonimine hydrochloride being obtained. Recrystallization of the crude compound from methanol gives crystals having a melting point of 175 to 176° C. (with decomposition).

*Analysis.*—Calculated for $C_{13}H_{16}N_5O_3Cl$ (percent): C, 47.93; H, 4.95; N, 21.50. Found (percent): C, 47.86; H, 4.96; N, 21.57.

EXAMPLE 6

To 1.0 part by weight of 3-morpholinosydnonimine hydrochloride dissolved in 5 parts by volume of water there is added, under ice-cooling with stirring, 0.4 part by weight of sodium nitrite in 15 parts by volume of water. The mixture is agitated for 6 hours, and then allowed to stand overnight to yield yellow precipitates, which are recovered by filtration.

Recrystallization of the precipitates gives 0.8 part by weight of yellow prisms of 3-morpholino-N-nitroso sydnonimine having a melting point of 130° C. (with decomposition).

*Analysis.*—Calculated for $C_6H_9N_5O_3$ (percent): C, 36.18; H, 4.55; N, 35.16. Found (percent): C, 36.06; H, 4.53; N, 34.94.

EXAMPLE 7

Two parts by weight of 3-morpholinosydnonimine hydrochloride are dissolved in an excess of trifluoro-acetic acid anhydride. After standing overnight, the mixture is concentrated to dryness under highly reduced pressure. Thus-yielded crude crystals are carefully recrystallized from ethanol to obtain 2.3 parts by weight (89.5%) of pure 3-morpholino-N-trifluoroacetyl sydnonimine having a melting point of 167 to 168° C. (with decomposition).

*Analysis.*—Calculated for $C_8H_9N_4OF_3$ (percent): C, 36.10; H, 3.41; N, 21.05. Found (percent): C, 36.22; H, 3.72; N, 21.69.

EXAMPLE 8

To 3.0 parts by weight of 3-morpholinosydnonimine hydrochloride suspended in 30 parts by volume of water, there are added 1.3 parts by weight of sodium bicarbonate under ice-cooling and with stirring, after which the mixture is further agitated for about 10 minutes. To the thus-treated mixture, there is added dropwise under ice-cooling, 3.0 parts by weight of p-nitrophenyl formate dissolved in 20 parts by volume of tetrahydrofuran. The mixture solution is further agitated two hours, the temperature of the reaction system rising to room temperature. After the tetrahydrofuran is distilled off from the reaction mixture, p-nitrophenol and unreacted reagent are removed by extraction with ether, and then, from the thus-treated reaction mixture, the objective compound is extracted several times with ethyl acetate.

After being dried, the extractant is subjected to distillation to remove the solvent to leave crude crystals of 3-morpholino-N-formylsydnonimine. The crude crystals are recrystallized from ethanol to obtain 2.3 parts by weight (80%) of pure crystals having a melting point of 149 to 151° C. (with decomposition).

*Analysis.*—Calculated for $C_7H_{10}N_4O_3$ (percent): C, 42.42; H, 5.09; N, 28.27. Found (percent): C, 42.25; H, 5.17; N, 28.47.

The objective compound can also be produced by the following process: 3.0 parts by weight of 3-morpholinosydnonimine hydrochloride are dissolved in an excess amount of formic acid anhydride. After standing overnight, the mixture is concentrated to dryness. Thus-obtained crude crystals are recrystallized from ethanol to yield 2.5 parts by weight (87%) of 3-morpholino-N-formyl sydnonimine.

EXAMPLE 9

To 4.0 parts by weight of 3-morpholinosydnonimine hydrochloride suspended in 40 parts by volume of water, there are added 1.7 parts by weight of sodium bicarbonate under ice-cooling and agitation, and the mixture is further agitated for about 10 minutes. To the thus-treated mixture there is added dropwise, under ice-cooling and with stirring, 4.5 parts by weight of p-nitrophenyl monochloroacetate dissolved in 20 parts by volume of tetrahydrofuran. Thus-resulting mixture is stirred for further 2 hours, the temperature of the reaction system rising to room temperature. Tetrahydrofuran is distilled off from the reaction mixture, and to the residue there is added water, crude crystals being preicpitated. The crystals are washed with water and ether and are then recrystallized from ether to obtain 4.5 parts by weight (91%) of 3-morpholino-N-monochloroacetyl sydnonimine having a melting point of 105 to 107° C.

*Analysis.*—Calculated for $C_8H_{11}N_4O_3Cl$ (percent): C, 38.95; H, 4.50; N, 22.72. Found (percent): C, 39.07; H, 4.56; N, 22.61.

EXAMPLE 10

In a similar manner to Example 9, 4.0 parts by weight of 3-morpholinosydnonimine hydrochloride is reacted with 5 parts by weight of p-nitrophenyl dichloroacetate to obtain 5.0 parts by weight (89%) of 3-morpholino-N-dichloroacetyl sydnonimine having a melting point of 165 to 167° C. (with decomposition).

*Analysis.*—Calculated for $C_8H_{10}N_4O_3Cl_2$ (percent): C, 34.18; H, 3.59; N, 19.93. Found (percent): C, 34.46; H, 3.52; N, 19.91.

EXAMPLE 11

Into 3.1 parts by weight of 3-morpholinosydnonimine hydrochloride suspended in 25 parts by volume of dry pyridine, there are stirred 3 parts by weight of trichloroacetyl chloride under ice-cooling, and the mixture is then further agitated for 4 hours at a temperature of 5 to 10° C.

The reaction mixture is cooled again with ice, and about 50 parts by volume of water is then added to the thus-treated mixture, crude crystals being precipitated. After recovering the crystals by filtration, they are washed with water, and then recrystallized from ethanol to yield 4.5 parts by weight (95%) of crystals of 3-morpholino-N-trichloroacetyl sydnonimine having a melting point of 180 to 181.5° C. (with decomposition).

*Analysis.*—Calculated for $C_8H_9N_4O_3Cl_3$ (percent): C, 30.45; H, 2.87; N, 17.76. Found (percent): C, 30.25; H, 2.74; N, 17.90.

EXAMPLE 12

3.0 parts by weight of 3-morpholinosydnonimine hydrochloride are suspended in a mixture of 19.0 parts by weight of propionic acid anhydride and 4 parts by volume of pyridine, followed by stirring for about 20 hours at room temperature, white crystals being precipitated. The crystals, collected by filtration, are recrystallized from isopropanol to obtain 3.2 parts by weight of 3-morpholino-N-propionyl sydnonimine hydrochloride having a melting point of 169 to 171° C. (with decomposition).

*Analysis.*—Calculated for $C_9H_{15}N_4O_3Cl$ (percent): C, 41.45; H, 5.76; N, 21.33. Found (percent): C, 41.42; H, 5.78; N, 21.23.

EXAMPLE 13

Into 2.0 parts by weight of 3-morpholinosydnonimine hydrochloride suspended in 15 parts by volume of pyridine, there are stirred dropwise 1.7 parts by weight of phenyl propionyl chloride under ice-cooling. After allowing the reaction mixture to stand overnight, pyridine is distilled off therefrom under reduced pressure, and the resulting oily substance is washed with ether to remove impurities.

Thereupon, the oily substance is subjected to silica gel column chromatography, using ethyl acetate as solvent. Concentration of the eluate gives 0.5 parts by weight of powdery product. This powdery product is recrystallized from methanol to obtain 0.3 part by weight of needle crystals of 3-morpholino-N-phenyl propionyl sydnonimine having a melting point of 127 to 129° C.

*Analysis.*—Calculated for $C_{15}H_{18}N_4O_3$ (percent): C, 59.59; H, 5.96; N, 18.53. Found (percent): C, 59.46; H, 6.02; N, 18.15.

EXAMPLE 14

Into 2.0 parts by weight of 3-morpholinosydnonimine hydrochloride suspended in 15 parts by volume of pyridine, there are stirred under ice-cooling 2.5 parts by weight of cinnamoyl chloride. After the mixture is allowed to stand overnight, water is added thereto, pyridine hydrochloride dissolves in the water and crystals separate out. After recovering the crystals by filtration, they are recrystallized from ethanol to obtain 2 parts by weight of flake crystals of 3-morpholino-N-cinnamoylsydnonimine having a melting point of 184 to 187° C.

*Analysis.*—Calculated for $C_{15}H_{16}N_4O_3$ (percent): C, 59.99; H, 5.37; N, 18.66. Found (percent): C, 59.85; H, 5.46; N, 18.54.

EXAMPLE 15

Into 1.0 part by weight of 3-dimethylaminosydnonimine hydrochloride suspended in 5 parts by volume of pyridine, there is stirred 1.2 parts by weight of benzoyl chloride, under ice-cooling, after which the mixture is agitated further 2 hours.

After the mixture has been allowed to stand overnight, there is further added thereto 1.0 part by weight of benzoyl chloride, followed by stirring.

Thus-prepared mixture is subjected to distillation under reduced pressure at a temperature below 40° C. to remove the solvent. The resulting residue is dissolved in chloroform, and the chloroform layer is washed with water, dehydrated by magnesium sulfate and subjected to distillation to remove chloroform, whereby brown oily substance is produced. The oily substance is then purified by means of silica gel chromatography (solvent: ethyl acetate) to obtain crude crystals. Recrystallization of the crude crystals from ethanol gives 0.8 part by weight of 3-dimethylamino-N-benzoyl sydnonimine having a melting point of 127 to 128° C.

*Analysis.*—Calculated for $C_{11}H_{12}N_4O_2$ (percent): C, 56.89; H, 5.21; N, 24.13. Found (percent): C, 56.81; H, 5.20; N, 24.31.

EXAMPLE 16

Into 1.0 part by weight of 3-dimethylamino-4-methylsydnonimine hydrochloride suspended in 3 parts by volume of pyridine, there is stirred 1 part by weight of benzoyl chloride under ice-cooling, followed by further stirring for 4 hours. The mixture is subjected to distillation to remove pyridine, and the resulting residue is dissolved in ethyl acetate and decolored by activated charcoal.

Thus-treated solution is concentrated to precipitate crude crystals. Recrystallization of the crude crystals from methanol yields 0.1 part by weight of 3-dimethylamino-4-methyl-N-benzoyl sydnonimine having a melting point of 109° C. to 110° C.

*Analysis.*—Calculated for $C_{11}H_{14}N_4O_2$ (percent): C, 58.52; H, 5.73; N, 22.75. Found (percent): C, 58.60; H, 5.85; N, 22.74.

EXAMPLE 17

Into 1.0 part by weight of 3-morpholinosydnonimine hydrochloride suspended in 5 parts by volume of dry pyridine, there is stirred dropwise 1.0 part by weight of phenoxy acetyl chloride under ice-cooling, followed by continued agitation for 10 hours. 0.6 part by weight of phenoxy acetyl chloride is further added to the mixture, followed by stirring for 8 hours. To the resultant mixture, there is added 50 parts by volume of water, and the aqueous layer is separated from the oily layer by decantation. Crystals separated from the aqueous layer are collected by filtration and recrystallized from ethanol to obtain 0.15 part by weight of 3-morpholino-N-phenoxy acetyl sydnonimine.

On the other hand, the oily layer is dissolved in ethyl acetate, and dried with magnesium sulfate. The solvent is distilled off from the solution to yield brown oily residue. The residue is purified by means of silica gel column chromatography (solvent: ethyl acetate) to obtain 0.2 part by weight of crystals.

Recrystallization of the crystals from ethanol gives 0.5 part by weight of crystals of 3-morpholino-N-phenoxy acetyl sydnonimine.

These crystals have a melting point of 149 to 151° C.

*Analysis.*—Calculated for $C_{14}H_{16}N_4O_4$ (percent): C, 55.26; H, 5.30; N, 18.41. Found (percent): C, 54.93; H, 5.20; N, 18.36.

EXAMPLE 18

Into 1.0 part by weight of 3-morpholinosydnonimine hydrochloride dissolved in a small amount of water, there is stirred 0.8 part by weight of sodium bicarbonate, and then 0.8 part by weight of carbobenzoxy chloride under ice-cooling. To the mixture, there is then added a small amount of methanol, followed by allowing the mixture to stand for a few hours to precipitate crystals.

The solvent is distilled off from the filtrate under reduced pressure to separate additional crystals.

Recrystallization of the combined crystals from methanol gives 0.7 part by weight of 3-morpholino-N-carbobenzoxyl sydnonimine having a melting point of 115 to 116° C. as flake crystals.

*Analysis.*—Calculated for $C_{14}H_{16}N_4O_4$ (percent): C, 55.26; H, 5.30; N, 18.41. Found (percent): C, 55.39; H, 5.29; N, 19.10.

EXAMPLE 19

To 1.0 part by weight of 3-morpholino sydnonimine hydrochloride dissolved in a small amount of water there is added 0.4 part by weight of sodium bicarbonate, after which 0.4 part by weight of diketene is stirred in dropwise under ice-cooling.

After stirring further for about two hours, the mixture becomes cloudy and crystals are precipitated. The crystals are collected by filtration and washed with water to obtain 1.0 part by weight of crude crystals. These crude crystals are recrystallized from methanol to yield 0.6 part by weight of 3-morpholino-N-acetoacetylsydnonimine having a melting point of 110–113° C. as flake crystals.

*Analysis.*—Calculated for $C_{10}H_{14}N_4O_4$ (percent): C, 47.24; H, 5.55; N, 22.04. Found (percent): C, 47.30; H, 5.33; N, 21.25.

EXAMPLE 20

A mixture of 2.7 parts by weight of N-carbobenzyloxy-L-alanine, 2.5 parts by weight of dicyclohexylcarbodiimide and 100 parts by volume of acetonitrile is stirred for two hours at room temperature. To the thus-treated mixture, there are added 2.0 parts by weight of 3-morpholino sydnonimine hydrochloride and 1.6 parts by weight of dry pyridine, and the mixture is stirred for about ten hours.

Separated precipitates comprising dicyclohexylurea, unreacted 3-morpholinosydnonimine hydrochloride, etc. are removed by filtration and the filtrate is concentrated under reduced pressure to obtain an oily substance. The oily substance is subjected to silica gel chromatography (silica gel column: 6 x 10 cm.; solvent: ethyl acetate; volume of 1 fraction: 15 ml.) and fraction numbers from 27 to 70, are combined together, followed by concentration under reduced pressure. Thus-obtained residue is recrystallized from a mixture of ethyl acetate and ethyl ether to obtain 0.94 part by weight (24%) of 3-morpholino-N-(N'-carbobenzyloxy-L-alanyl) sydnonimine having a melting point of 108–110° C.

*Analysis.*—Calculated for $C_{17}H_{21}N_5O_5$ (percent): C, 54.39; H, 5.64; N, 18.66. Found (percent): C, 54.13; H, 5.49; N, 18.70.

EXAMPLE 21

Into 2.0 parts by weight of 3-morpholinosydnonimine hydrochloride suspended in 20 parts by volume of water, there is stirred 0.9 part by weight of sodium bicarbonate under ice-cooling, after which the mixture is further stirred for about ten minutes. To the mixture, there is then stirred 4 parts by weight of N-carbobenzyloxy-L-alanyl-p-nitrophenyl ester in 10 parts by volume of tetrahydrofuran under ice-cooling, and then the mixture is further agitated for two hours, whereby the temperature of the reaction system rises to room temperature. 1.0 part by weight of sodium bicarbonate is added to the reaction mixture and the mixture is extracted with ethyl acetate three times. The extractant is dried and the solvent is removed by concentration under reduced pressure. Thus-separated oily substance is purified by means of silica gel column chromatography after the manner of Example 20 to obtain 2.1 parts by weight (56%) of 3-morpholino-N-(N'-carbobenzyloxy-L-alanyl) sydnonimine having a melting point of 108–110° C.

*Analysis.*—Calculated for $C_{17}H_{21}N_5O_5$ (percent): C, 54.39; H, 5.64; N, 18.66. Found (percent): C, 54.13; H, 5.49; N, 18.70.

EXAMPLE 22

0.29 part by volume of ethylchloroformate are stirred dropwise into a mixture of 0.67 part by weight of N-carbobenzoxy-L-alanine, 0.42 part by volume of triethylamine and 6 parts by volume of tetrahydrofuran under ice-cooling, and then the mixture is further stirred for about 15 minutes. Into the reaction mixture there is then stirred dropwise under ice-cooling a suspension which is prepared by reacting 0.6 part by weight of 3-morpholinosydnonimine hydrochloride, with 0.26 part by weight of sodium bicarbonate in 6 parts by volume of water under ice-cooling and with stirring, followed by further stirring for 1 hour, the temperature of the reaction system rising to room temperature. The reaction mixture is then extracted three times with ethylacetate. The extractant is dried, and the solvent is distilled off under reduced pressure. Thus-obtained residue is washed with ethyl ether, and then recrystallized from ethyl acetate-ethyl ether to give 0.86 part by weight (76%) of 3-morpholino-N-(N-carbobenzoxy-L-alanyl) sydnonimine.

EXAMPLE 23

To 1.2 parts by weight of nicotinic acid suspended in 10 parts by volume of dry tetrahydrofuran, there are added 1.1 parts by weight of ethylchloroformate and 1.0 part by weight of triethylamine under cooling, the precipitated crystals of triethylamine hydrochloride being removed by filtration to obtain a mixed anhydride solution as the filtrate.

On the other hand, to 2.0 parts by weight of 3-morpholino-sydnonimine hydrochloride dissolved in a small amount of water, there is added under cooling 0.8 part by weight of sodium bicarbonate and then the filtrate obtained above is added dropwise. The resultant solution is extracted with ethylacetate. After the extractant is dried, the solvent is removed under reduced pressure to give crude crystals. Recrystallization of the crude crystals from methanol gives 0.3 part by weight of 3-morpholino-N-nicotinoylsydnonimine having a melting point of 202 to 204° C.

*Analysis.*—Calculated for $C_{12}H_{13}N_5O_3$ (percent): C, 52.36; H, 4.76; N, 25.44. Found (percent): C, 52.08; H, 4.70; N, 25.80.

EXAMPLE 24

After the manner of Example 3, 3-morpholino-N-p-acetoaminophenyl sulfonyl sydnonimine having a melting point of 198–199° C. (with decomposition) is obtained from the corresponding reactants.

*Analysis.*—Calculated for $C_{14}H_{17}N_5O_5S$ (percent): C, 45.77; H, 4.66; N, 19.06. Found (percent): C, 45.74; H, 4.80; N, 18.63.

EXAMPLE 25

After the manner of Example 6, the following compounds are obtained from the corresponding reactants:

3-piperidino-N-nitroso sydnonimine, M.P. 124° (with decomposition)
3-dibutylamino-N-nitroso sydnonimine, M.P. 53°
3-dibenzylamino-4-methyl-N-nitroso sydnonimine, M.P. 103–106° (with decomposition)
3-pyrrolidino-N-nitroso sydnonimine, M.P. 132–134° (with decomposition)
3-α-pipecolino-N-nitroso sydnonimine, M.P. 83–84° (with decomposition)
3,3'-(1,4-piperazino-diyl)-N,N-dinitroso bis sydnonimine, M.P. 168–169° (with decomposition)
3-(N-methylpiperazino)-N-nitroso sydnonimine, M.P. 132–133° (with decomposition).

What is claimed is:
1. A compound according to claim 4, namely, 3-morpholino-N-benzoyl sydnonimine.
2. A compound according to claim 4, namely, 3-morpholino-N-carboethoxy sydnonimine.
3. A pharmaceutically acceptable salt of a compound according to claim 4.
4. A compound of the formula

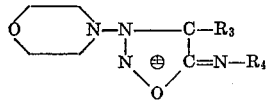

wherein $R_3$ is H or alkyl having one to five carbon atoms and $R_4$ is (a) —NO, or
(b) $R_5CO$— wherein $R_5$ is alkyl having 1 to 5 carbon atoms, alkyl having 1 to 2 carbon atoms substituted by 1 to 3 chlorine or fluorine atoms, phenoxyalkyl having 7 to 9 carbon atoms, phenylalkyl having 7 to 9 carbon atoms, phenylalkenyl having up to 9 carbon atoms, acetylmethyl, propionylethyl, alkoxy having 1 to 5 carbon atoms, phenylalkoxy having 7 to 9 carbon atoms, hydrogen, phenyl, phenylamino, pyridyl or 1-(carbobenzyloxy amino)-ethyl, or
(c) $R_6SO_2$— wherein $R_6$ is monochlorophenyl or p-acetylaminophenyl.

5. A compound according to claim 4, namely, 3-morpholino-N-acetyl sydnonimine.

References Cited
UNITED STATES PATENTS 3,277,108 10/1966 Daeniker _____ 260—307
3,312,690 4/1967 Masuda et al. _____ 260—239

ALEX MAZEL, Primary Examiner

J. TOVAR, Assistant Examiner

U.S. Cl. X.R.

260—240 U, 247.1, 247.2 B, 268 N, 293.69, 295 K, 295.5 A, 307 F; 424—248